United States Patent
Deng (10) Patent No.: US 10,587,874 B2
(45) Date of Patent: Mar. 10, 2020

(54) REAL-TIME VIDEO DENOISING METHOD AND TERMINAL DURING CODING, AND NON-VOLATILE COMPUTER READABLE STORAGE MEDIUM

(71) Applicant: Tencent Technology (Shenzhen) Company Limited, Shenzhen (CN)

(72) Inventor: Haibo Deng, Shenzhen (CN)

(73) Assignee: TENCENT TECHNOLOGY (SHENZHEN) LIMITED, Shenzhen (CN)

( * ) Notice: Subject to any disclaimer, the term of this patent is extended or adjusted under 35 U.S.C. 154(b) by 70 days.

(21) Appl. No.: 15/699,710

(22) Filed: Sep. 8, 2017

(65) Prior Publication Data

US 2017/0374363 A1 Dec. 28, 2017

Related U.S. Application Data

(63) Continuation-in-part of application No. PCT/CN2016/082415, filed on May 17, 2016.

(30) Foreign Application Priority Data

Nov. 18, 2015 (CN) .......................... 2015 1 0798985

(51) Int. Cl.
*H04N 19/117* (2014.01)
*H04N 19/80* (2014.01)
(Continued)

(52) U.S. Cl.
CPC ............ *H04N 19/117* (2014.11); *G06T 5/002* (2013.01); *G06T 5/10* (2013.01); *H04N 19/14* (2014.11);
(Continued)

(58) Field of Classification Search
None
See application file for complete search history.

(56) References Cited

U.S. PATENT DOCUMENTS

| | | | |
|---|---|---|---|
| 2003/0035586 A1* | 2/2003 | Chou | H04N 19/61 |
| | | | 382/233 |
| 2003/0142876 A1 | 7/2003 | Sugimoto et al. | |

(Continued)

FOREIGN PATENT DOCUMENTS

| | | |
|---|---|---|
| CN | 1703900 A | 11/2005 |
| CN | 101540834 A | 9/2009 |

(Continued)

OTHER PUBLICATIONS

Search Report IP.Com.*

(Continued)

*Primary Examiner* — Mohammad J Rahman
(74) *Attorney, Agent, or Firm* — Morgan, Lewis & Bokcius LLP (57) ABSTRACT

A video denoising method includes: while continuing to receive a video stream, performing multi-stage denoising processing on a respective frame, including: detecting a change in a current network status of a network connection; and, in response to detecting the change in the current network status: adjusting a current value for a predefine flatness threshold for detecting a flat area within the respective frame of the image stream in accordance with the change in the current network status of the network connection; identifying one or more flat areas within the respective image frame in accordance with the predefined flatness threshold; and performing, using a predefined filter, denoising processing on the one or more flat areas that have been identified in accordance with the predefined flatness threshold.

11 Claims, 5 Drawing Sheets

(51) Int. Cl.
| | | |
|---|---|---|
| *H04N 19/625* | (2014.01) | |
| *H04N 19/593* | (2014.01) | |
| *H04N 19/52* | (2014.01) | |
| *H04N 19/176* | (2014.01) | |
| *H04N 21/24* | (2011.01) | |
| *H04N 19/14* | (2014.01) | |
| *H04N 19/48* | (2014.01) | |
| *H04N 19/164* | (2014.01) | |
| *H04N 19/85* | (2014.01) | |
| *G06T 5/00* | (2006.01) | |
| *H04N 19/18* | (2014.01) | |
| *G06T 5/10* | (2006.01) | |

(52) U.S. Cl.
CPC ......... *H04N 19/164* (2014.11); *H04N 19/176* (2014.11); *H04N 19/18* (2014.11); *H04N 19/48* (2014.11); *H04N 19/52* (2014.11); *H04N 19/593* (2014.11); *H04N 19/625* (2014.11); *H04N 19/80* (2014.11); *H04N 19/85* (2014.11); *H04N 21/2402* (2013.01); *G06T 2207/10016* (2013.01); *G06T 2207/20012* (2013.01); *G06T 2207/20052* (2013.01)

(56) References Cited

U.S. PATENT DOCUMENTS

| | | | |
|---|---|---|---|
| 2004/0228538 | A1 | 11/2004 | Onuma et al. |
| 2009/0067504 | A1* | 3/2009 | Zheludkov ............. H04N 19/56 375/240.16 |
| 2009/0191814 | A1* | 7/2009 | Blu ......................... G06F 17/10 455/63.1 |
| 2009/0290645 | A1* | 11/2009 | Mabey ............... H04N 5/23203 375/240.25 |
| 2011/0091127 | A1* | 4/2011 | Kisilev ................... G06T 5/002 382/274 |
| 2011/0298984 | A1* | 12/2011 | Schoenblum ........ H04N 7/0127 348/607 |
| 2012/0116703 | A1* | 5/2012 | Pavillon ............... G03H 1/0866 702/70 |
| 2013/0156095 | A1* | 6/2013 | Li ........................ H04N 21/233 375/240.02 |
| 2013/0286288 | A1* | 10/2013 | Zhang .................... H04N 5/213 348/608 |
| 2013/0343470 | A1* | 12/2013 | Matsumura ............ H04N 5/142 375/240.29 |
| 2014/0072228 | A1* | 3/2014 | Rubinstein .............. G06T 7/207 382/197 |
| 2014/0072229 | A1* | 3/2014 | Wadhwa ................ G06K 9/481 382/197 |
| 2014/0185956 | A1* | 7/2014 | Kawata ................... G06T 5/002 382/275 |

FOREIGN PATENT DOCUMENTS

| | | |
|---|---|---|
| CN | 101742288 A | 6/2010 |
| CN | 101883280 A | 11/2010 |
| CN | 102801983 A | 11/2012 |
| CN | 103281526 A | 9/2013 |
| CN | 105472205 A | 4/2016 |
| JP | 06224773 A | 8/1994 |
| JP | 08186842 A | 7/1996 |
| JP | 2006011568 A | 1/2006 |

OTHER PUBLICATIONS

Tencent Technology, ISRWO, PCT/CN2016/082415, dated Jul. 26, 2016, 10 pgs.

Tencent Technology, IPRP, PCT/CN2016/082415, dated May 22, 2018, 8 pgs.

Peter MB Van Roosmalen et al: "Embedded Coring in MPEG Video Compression", IEEE Transactions on Circuits and Systems for Video Technology, Institute of Electrical and Electronics Engineering, USA, vol. 12, No. 3, Mar. 1, 2002, XP011071816, ISSN: 1051-8215.

Afonso M.A.M Teodorol et al.: "Single-frame Image Denoising and Inpainting Using Guassian Mixtures", Proceedings of the International Confernece on Pattern Recognition Applications and Methods—vol. 2 pp. 283-288 Jan. 10, 2015, Lisbon Portugal.

* cited by examiner

```
┌─────────────────────────────────────────────────────────────────┐
│  Receiving (320) an image stream comprising a sequence of       │
│              image frames from a video source;                  │
└─────────────────────────────────────────────────────────────────┘
                                │
                                ▼
┌─────────────────────────────────────────────────────────────────┐
│ While continuing to receive the video stream from the video     │
│ source, performing (322) multi-stage denoising processing on a  │
│ respective frame of the sequence of images frames in the video  │
│ stream, including:                                              │
│                                                                 │
│   ┌─────────────────────────────────────────────────────────┐   │
│   │ Detecting (3220) a change in a current network status   │   │
│   │ of a network connection between the electronic device   │   │
│   │ and a remote destination device for the image stream,   │   │
│   │ the change in the current network status includes a     │   │
│   │ change in a bandwidth of the network connection;        │   │
│   └─────────────────────────────────────────────────────────┘   │
│                              │                                  │
│                              ▼                                  │
│   ┌─────────────────────────────────────────────────────────┐   │
│   │ In response to detecting (3222) the change in the       │   │
│   │ current network status of the network connection        │   │
│   │ between the electronic device and the remote            │   │
│   │ destination device for the image stream:                │   │
│   │                                                         │   │
│   │   ┌─────────────────────────────────────────────────┐   │   │
│   │   │ Adjusting (3224) a current value for a predefine│   │   │
│   │   │ flatness threshold for detecting a flat area    │   │   │
│   │   │ within the respective frame of the image stream │   │   │
│   │   │ in accordance with the change in the current    │   │   │
│   │   │ network status of the network connection        │   │   │
│   │   └─────────────────────────────────────────────────┘   │   │
│   │                          │                              │   │
│   │                          ▼                              │   │
│   │   ┌─────────────────────────────────────────────────┐   │   │
│   │   │ Identifying (3226) one or more flat areas       │   │   │
│   │   │ within the respective image frame in accordance │   │   │
│   │   │ with the predefined flatness threshold that has │   │   │
│   │   │ been adjusted in accordance with the change in  │   │   │
│   │   │ the current network status of the network       │   │   │
│   │   │ connection                                      │   │   │
│   │   └─────────────────────────────────────────────────┘   │   │
│   │                          │                              │   │
│   │                          ▼                              │   │
│   │   ┌─────────────────────────────────────────────────┐   │   │
│   │   │ Performing (3228), using a predefined filter,   │   │   │
│   │   │ denoising processing on the one or more flat    │   │   │
│   │   │ areas that have been identified in accordance   │   │   │
│   │   │ with the predefined flatness threshold that has │   │   │
│   │   │ been adjusted in accordance with the change in  │   │   │
│   │   │ the network status of the network connection    │   │   │
│   │   └─────────────────────────────────────────────────┘   │   │
│   └─────────────────────────────────────────────────────────┘   │
│                              │                                  │
│                              ▼                                  │
│   ┌─────────────────────────────────────────────────────────┐   │
│   │ Performing (3230) inter frame compression encoding on   │   │
│   │                    the current frame                    │   │
│   └─────────────────────────────────────────────────────────┘   │
└─────────────────────────────────────────────────────────────────┘
```

REAL-TIME VIDEO DENOISING METHOD AND TERMINAL DURING CODING, AND NON-VOLATILE COMPUTER READABLE STORAGE MEDIUM

RELATED APPLICATION

This application is a continuation-in-part application of PCT/CN2016/082415, entitled "METHOD FOR REAL-TIME VIDEO NOISE REDUCTION IN CODING PROCESS, TERMINAL, AND NONVOLATILE COMPUTER READABLE STORAGE MEDIUM" filed on May 17, 2016, which claims priority to Chinese Patent Application No. 201510798985.1, filed with the State Intellectual Property Office of the People's Republic of China on Nov. 18, 2015, and entitled "REAL-TIME VIDEO DENOISING METHOD AND APPARATUS DURING CODING", both of which are incorporated herein by reference in their entirety.

FIELD OF THE TECHNOLOGY

The present disclosure relates to the field of signal processing, and in particular, to a real-time video denoising method and terminal during compression encoding, and a non-volatile computer readable storage medium.

BACKGROUND OF THE DISCLOSURE

At present, most smart phones already have a video shooting function. Due to the limitation of lenses and costs, the luminous flux of a single pixel is relatively poor, there is lots of random noise in a captured video, and in particular, the random noise is more obvious in a relatively dark scene. On the one hand, the noise reduces the definition and quality of an image. On the other hand, the residual is excessively large during compression encoding, leading to an increasing size of encoded streams and heavier load of networks and storage.

Performing preprocessing of denoising on the video not only can improve the video quality, but also facilitates network transmission. Therefore, video denoising has a practical value on a real-time streaming media service, a mobile videophone, network video chat, or the like that has limited bandwidth.

SUMMARY

An existing denoising method is usually based on a space domain or a time domain. Space-domain denoising such as means denoising, non-local means (NLM for short), block matching 3D (BM3D for short) only takes the correlation between neighboring pixels in a single image into consideration. The means denoising smoothes the edge and a texture region, causing that the image quality is reduced. The NLM and the BM3D needs great amount of calculation, and cannot adapt to a video chat scenario. Time-domain denoising takes information between neighboring frames into consideration. The basic idea of the time-domain denoising is to determine foreground and background pixels. Time-domain means denoising is used for a static background area, and the space-domain denoising is used for a moving foreground area. The difficulty of the method is to accurately determine the foreground and the background, and multi-frame data needs to be buffered. Consequently, the method is not applicable to the mobile terminal either.

There is another domain-transform method, that is, an image is converted into a frequency domain by means of transform such as wavelet transform or Fourier transform. Denoising processing on a high frequency band coefficient also achieves a desirable effect. This type of methods needs an extra transform process and relatively high calculation complexity.

In view of this, it is desirable to provide a real-time video denoising method during compression encoding, so as to make full use of integer discrete cosine transform information, reduce the amount of calculation, implement a real-time video, and break through the bottleneck of network bandwidth.

In addition, it is also desirable to provide a terminal during compression encoding and a non-volatile computer storage medium, so as to reduce the amount of calculation, implement a real-time video, and break through the bottleneck of network bandwidth.

A video denoising method, comprising: at an electronic device having one or more processors and memory:
  receiving an image stream comprising a sequence of image frames from a video source;
  while continuing to receive the video stream from the video source, performing multi-stage denoising processing on a respective frame of the sequence of images frames in the video stream, including:
    detecting a change in a current network status of a network connection between the electronic device and a remote destination device for the image stream, the change in the current network status includes a change in a bandwidth of the network connection;
    in response to detecting the change in the current network status of the network connection between the electronic device and the remote destination device for the image stream:
      adjusting a current value for a predefine flatness threshold for detecting a flat area within the respective frame of the image stream in accordance with the change in the current network status of the network connection;
      identifying one or more flat areas within the respective image frame in accordance with the predefined flatness threshold that has been adjusted in accordance with the change in the current network status of the network connection; and
      performing, using a predefined filter, denoising processing on the one or more flat areas that have been identified in accordance with the predefined flatness threshold that has been adjusted in accordance with the change in the network status of the network connection.

A real-time video denoising method during encoding, including the following operations:
  obtaining a current frame of an image and a flat area in the current frame;
  performing denoising processing on the flat area;
  determining whether the current frame is a P frame; and if yes, reading a sub-macroblock of the current frame; or if not, ending the procedure; and
  determining whether the currently read sub-macroblock is an inter sub-macroblock; if yes, performing integer discrete cosine transform on the currently read sub-macroblock, performing denoising processing on the current sub-macroblock on which the integer discrete cosine transform is performed, and further determining whether the currently read sub-macroblock is the last inter sub-macroblock of the current frame; and if yes, ending the procedure; otherwise reading the next sub-macroblock, and further performing the operation of determining whether the currently read sub-macroblock is an inter sub-macroblock.

A terminal, including a memory and a processor, the memory storing computer readable instructions, the instructions, when executed by the processor, causing the processor to perform the methods described herein.

One or more non-volatile non-transitory computer readable storage mediums including computer executable instructions, the computer executable instructions causing, when executed by one or more processors, the processors to perform the methods described herein.

The details of one or more embodiments of the present technology are provided in the following accompanying drawings and description. Other features, objectives, and advantages of the present disclosure become more obvious in the specification, the accompanying drawings, and the claims.

BRIEF DESCRIPTION OF THE DRAWINGS

To describe the technical solutions in the embodiments of the present technology or in the existing technology more clearly, the following briefly describes the accompanying drawings required for describing the embodiments or the existing technology. Apparently, the accompanying drawings in the following description show merely some embodiments of the present technology, and a person of ordinary skill in the art may still derive other drawings from these accompanying drawings without creative efforts.

FIG. 3B is a flowchart of a video denoising method according to an embodiment;

DESCRIPTION OF EMBODIMENTS

To make the objectives, technical solutions, and advantages of the present disclosure clearer, the following further describes the present disclosure in detail with reference to the accompanying drawings and embodiments. It should be understood that the specific embodiments described herein are merely intended to explain the present disclosure rather than limiting the present disclosure.

Figure 1:
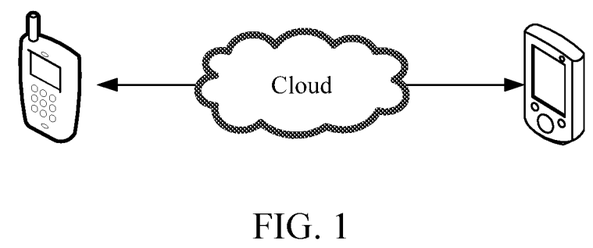
FIG. 1 is a schematic diagram of an application environment of a real-time video denoising method during compression encoding according to an embodiment.

FIG. 1 is a schematic diagram of an application environment of a real-time video denoising method during encoding according to an embodiment. The application environment may include one or more terminals. The real-time video denoising method may be applied to video denoising processing in a video shooting function of a terminal or video denoising processing in a real-time streaming media service, or may be applied to video denoising processing in a real-time video call between multiple terminals. FIG. 1 is an application environment of performing a real-time video call by two terminals. The application environment is merely an example and is not limited herein. In another embodiment, multiple terminals may transmit data by using a server.

Figure 2:
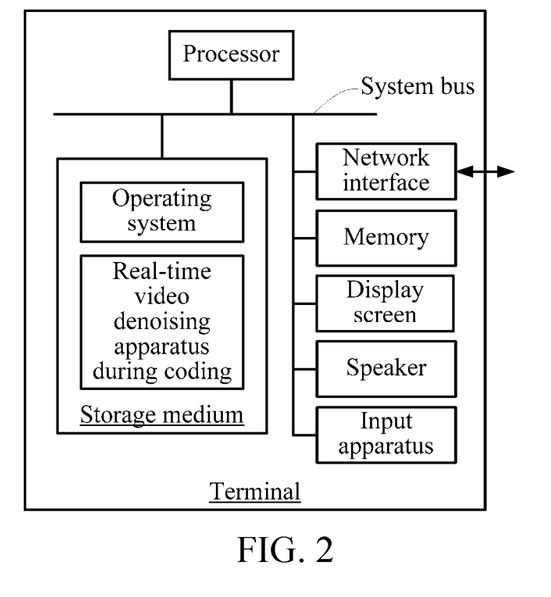
FIG. 2 is a schematic diagram of an internal structure of a terminal in FIG. 1 according to an embodiment.

FIG. 2 is a schematic diagram of an internal structure of a terminal in FIG. 1 according to an embodiment. As shown in FIG. 2, the terminal includes a processor, a storage medium, a memory, a network interface, a voice collection apparatus, a display screen, a speaker, and an input apparatus that are connected by means of a system bus. The storage medium of the terminal stores an operating system, and further includes a real-time video denoising apparatus during encoding. The real-time video denoising apparatus during encoding is configured to implement a real-time video denoising method during encoding. The processor is configured to: provide calculation and control capabilities, and support the running of the entire terminal. The memory in the terminal provides an environment for the running of the real-time video denoising apparatus in the storage medium. The network interface is configured to perform network communication with a server or another terminal, for example, sending data to the server or the terminal, and receiving data returned by the server or the terminal. The display screen of the terminal may be a liquid crystal display screen or an electronic ink display screen. The input apparatus may be a touch layer covered on the display screen, or may be a key, a track ball, or a touch panel that is disposed on the housing of the terminal, or may be an externally connected keyboard, touch panel, or mouse. The terminal may be a mobile phone, a tablet computer, or a personal digital assistant. A person skilled in the art may understand that the structure shown in FIG. 2 is merely a block diagram of a part of the structure related to the solutions of this application, and does not constitute a limitation to a terminal to which the solutions of the this application are applied. A specific terminal may include more components or fewer components than those shown in the figure, or some components may be combined, or a different component deployment may be used.

Figure 3A:
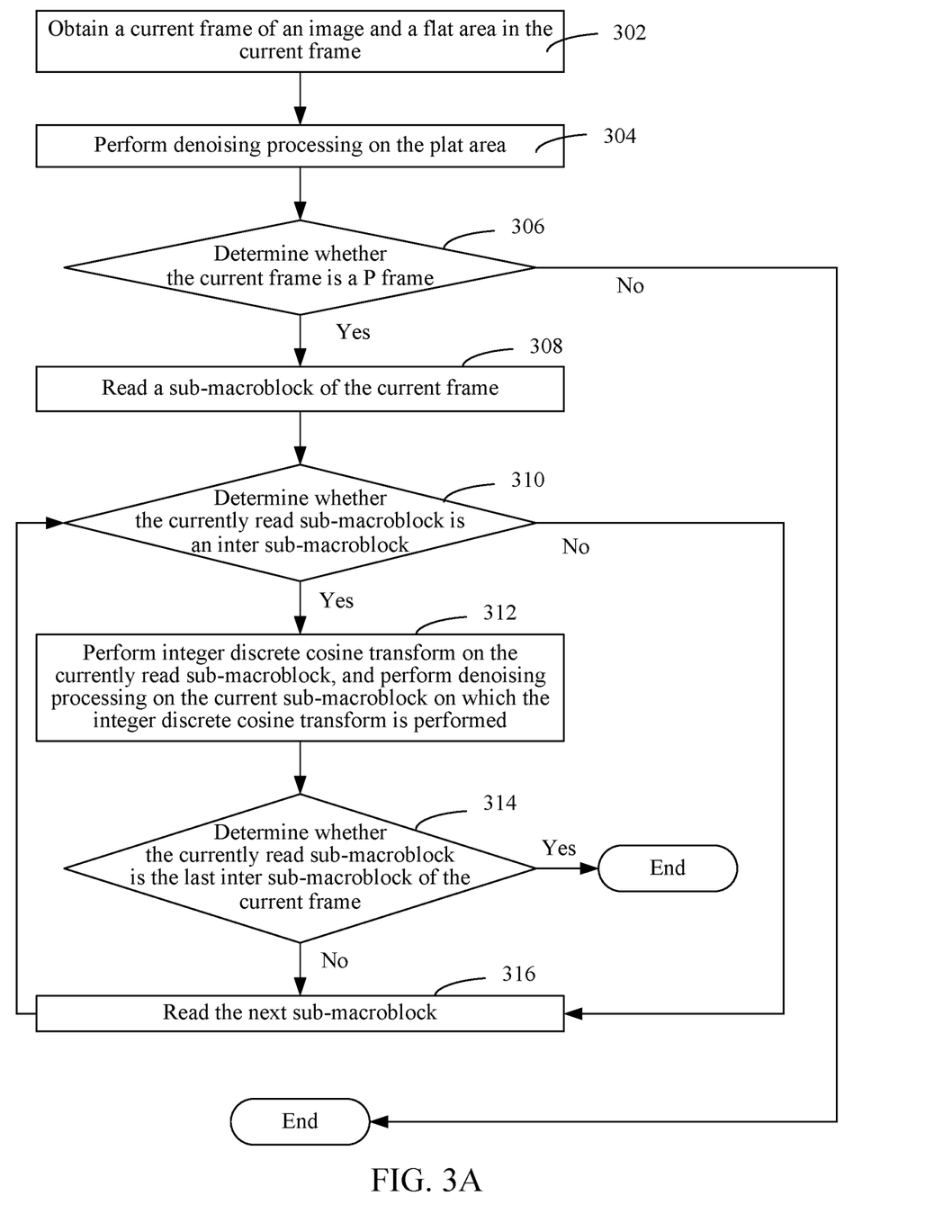
FIG. 3A is a flowchart of a real-time video denoising method during compression encoding according to an embodiment.

FIG. 3A is a flowchart of a real-time video denoising method during encoding according to an embodiment. As shown in FIG. 3, a real-time video denoising method during encoding includes the following operations:

Operation 302: Obtain a current frame of an image and a flat area in the current frame.

In an embodiment, the operation of obtaining a flat area in the current frame includes: obtaining a current pixel in the current frame and a selected area of multiple adjacent pixels including the current pixel; and determining whether an absolute value of a difference between a pixel value of the remaining pixel in the area and a pixel value of the current pixel is less than a specified flatness threshold; and if yes, determining that the area belongs to the flat area; or if not, determining that the area is not a flat area.

Specifically, the image may be encoded by using YUV or RGB color space. Y in the YUV indicates the luminance, that is, a gray-scale value; U and V indicate the chrominance, and are used for: describing the color and saturation of the image and specifying the color of a pixel. The RGB is Red (red), Green (green), and Blue (blue).

Suppose that a range of the gray-scale value is [0, 255], the width of the image is M, and the height is N. The specified flatness threshold is TH, a pixel value of a current pixel (i,j) is p(i,j), the radius of a filter template is r, a range with the radius r of the filter template is the area including the current pixel. When an absolute value of a difference between a pixel value of a pixel in the range with the radius r of the filter template and the pixel value p(i,j) of the current pixel (i,j) is less than the specified threshold TH, it is determined that an area having the range with the radius r of the filter template is a flat area.

Operation 304: Perform denoising processing on the flat area.

Specifically, denoising processing on a pixel in the flat area may be performed by means of means denoising or weight averaging denoising.

A pixel value of the pixel that is obtained by performing means denoising processing on the pixel in the flat area may be an average value of pixel values of all pixels, in the flat area, whose absolute value of a difference with the pixel value of the pixel is less than the specified flatness threshold.

A calculation formula is as Formula (1) and Formula (2).

$$p'(i, j) = \sum_{m=i-r/2, n=j-r/2}^{m=i+r/2, n=j+r/2} \text{sign}(m, n) * p(m, n) \Big/ \sum_{m=i-r/2, n=j-r/2}^{m=i+r/2, n=j+r/2} \text{sign}(m, n) \quad \text{Formula (1)}$$

$$\text{sign}(m, n) = \begin{cases} 1 & \text{if } (\text{abs}(p(i, j) - p(m, n)) < TH \\ 0 & \text{else} \end{cases} \quad \text{Formula (2)}$$

p(i,j) indicates a pixel value of a pixel (i,j) on which denoising is not performed; p(m,n) indicates a pixel value of a pixel (m,n) on which denoising is not performed; p'(i,j) indicates a pixel value of the pixel (i,j) on which the denoising has been performed. A value range of (m,n) is determined by the radius r.

Performing weight averaging denoising on the pixel in the flat area means assigning a weight value to each pixel involved in the calculation in Formula (1) and Formula (2). Pixel values of all pixels whose absolute value of a difference with a pixel value of the pixel is less than the specified flatness threshold in the flat area is multiplied by weight values corresponding to the pixels, and then an average value is evaluated, so as to obtain a pixel value of the pixel on which the denoising is performed. In some embodiments, the weight values for all pixels within the same flat area are a common normalizing value.

The specified threshold TH herein may be controlled by the filtering strength. If TH=255, the filtering is degraded to common, conventional, means filtering. In this case, the filtering strength is the strongest. If TH=0, the image is not filtered. Therefore, if the bandwidth is relatively low, a value of TH may be duly increased accordingly, and relatively strong filtering is performed on the image, so as to reduce the code rate (e.g., the rate that encoded image stream is transmitted over the network), such that the bandwidth and the code rate is matched well and streaming is smooth and uninterrupted. If the bandwidth is relatively high, the value of TH may be decreased, so that only the really uniform flat areas are filtered, to prevent damage of texture and loss of boundary information in the images when denoising the flat areas.

Operation 306: Determine whether the current frame is a P frame (a forward predictive frame); and if yes, perform operation 308; or if not, end the procedure. An inter frame (e.g., a P frame or a B frame) is a frame in a video compression stream which is expressed in terms of one or more neighboring frames. The "inter" part of the term refers to the use of Inter frame prediction. This kind of prediction tries to take advantage from temporal redundancy between neighboring frames enabling higher compression rates. An inter coded frame is divided into blocks known as macroblocks. After that, instead of directly encoding the raw pixel values for each block, the encoder will try to find a block similar to the one it is encoding on a previously encoded frame, referred to as a reference frame. This process is done by a block matching algorithm. If the encoder succeeds on its search, the block could be encoded by a vector, known as motion vector, which points to the position of the matching block at the reference frame. The process of motion vector determination is called motion estimation. In most cases the encoder will succeed, but the block found is likely not an exact match to the block it is encoding. This is why the encoder will compute the differences between them. Those residual values are known as the prediction error and need to be transformed and sent to the decoder.

Specifically, frames during video encoding are classified into an I frame, a P frame, and a B frame. The I frame is an intra reference frame, is also referred to as a key frame, and is the first frame of GOP (Group of Pictures) encoding. The encoding of the I frame does not rely on previous and following frames. The P frame is a encoding image of compressing the transmitted data volume by fully reducing time redundant information with a previous coded frame in an image sequence, and is also referred to as a predicted frame. The B frame is a bi-directional predicted frame. Reference frames of the B frame are several previous neighboring frames, the current frame, and several following frames. After I frame space is set during the video encoding, only P frames and B frames may exist between two neighboring I frames. An application scenario of a video call requires for extremely high real time. I frames and P frames are usually selected and used, rather than B frames with latency.

Operation 308: Read a sub-macroblock of a plurality of sub-macro-block of the current frame.

Specifically, the current frame may be a macroblock, and may be divided into multiple sub-macroblocks. Using H.264 as an example, the size of a sub-macroblock may be 8×8, 16×16, or the like. The size of the sub-macroblock is less than or equal to that of the macroblock. First, the first sub-macroblock of the current frame is read.

Operation 310: Determine whether the currently read sub-macroblock is an inter sub-macroblock; and if yes, perform operation 312; or if not, perform operation 316.

Specifically, the inter sub-macroblock refers to macroblocks that are between reference sub-macroblocks (e.g., analogous to inter frames which are frames between reference frames". A coefficient of the inter sub-macroblock may be adjusted by using a value of a reference sub-macroblock thereof, so that the inter sub-macroblock is closer to the reference sub-macroblock of the inter sub-macroblock. An intra sub-macroblock has no corresponding reference sub-macroblock. Therefore, the intra sub-macroblock is not processed using the denoising processing described herein for the inter sub-macroblocks. The intra sub-macroblock only relies on a current frame, and is obtained by means of prediction according to the upper pixel and the left pixel of the location of the current frame. In some embodiments, the inter sub-macroblocks and the reference sub-macroblocks thereof are obtained from different frames (e.g., the current frame and a respective reference frame for a respective sub-macroblock in the current frame).

Operation 312: Perform integer discrete cosine transform on the currently read sub-macroblock, and perform denoising processing on the current sub-macroblock on which the integer discrete cosine transform is performed.

Specifically, the integer discrete cosine transform is performed on the currently read sub-macroblock during compression encoding (e.g., as a pre-processing operation for the compression encoding).

Operation 314: Determine whether the currently read sub-macroblock is the last inter sub-macroblock of the current frame; and if yes, end the procedure; or if not, perform operation 316.

Operation 316: Read the next sub-macroblock in the currently read frame, and further perform operation 310.

By means of the real-time video denoising method during encoding, denoising processing is first performed on the flat areas of an image, so as to reduce noise in the flat areas; integer discrete cosine transform is further performed on the sub-macroblocks of a currently read frame; denoising processing is performed on the current sub-macroblock on which the integer discrete cosine transform has been performed. The integer discrete cosine transform is an existing module used during compression encoding, and therefore can be directly called repeatedly, so as to reduce the amount of calculation. The size of encoded data streams is decreased by means of denoising, a real-time video is implemented, and the bottleneck of network bandwidth is broken through.

FIG. 3B is a block diagram of a two-stage denoising process which is based on and can be combined with the method described above in accordance with some embodiments. In the denoising process, the terminal performs the following operations:

Receiving (320) an image stream comprising a sequence of image frames from a video source;

While continuing to receive the video stream from the video source, performing (322) multi-stage denoising processing on a respective frame of the sequence of images frames in the video stream, including:
- detecting (3220) a change in a current network status of a network connection between the electronic device and a remote destination device for the image stream, the change in the current network status includes a change in a bandwidth of the network connection;
- in response to detecting (3222) the change in the current network status of the network connection between the electronic device and the remote destination device for the image stream:
  - adjusting (3224) a current value for a predefine flatness threshold for detecting a flat area within the respective frame of the image stream in accordance with the change in the current network status of the network connection;
  - identifying (3226) one or more flat areas within the respective image frame in accordance with the predefined flatness threshold that has been adjusted in accordance with the change in the current network status of the network connection; and
  - Performing (3228), using a predefined filter, denoising processing on the one or more flat areas that have been identified in accordance with the predefined flatness threshold that has been adjusted in accordance with the change in the network status of the network connection.

Performing (3230) inter frame compression encoding on the current frame.

In some embodiments, when a different between pixel values of a respective pixel and an adjacent pixel thereof is below the predefined flatness threshold, the adjacent pixel is included in a respective flat area containing the respective pixel.

In some embodiments, adjusting the current value for the predefined flatness threshold for detecting a flat area within the respective frame includes: increasing the current value for the predefined flatness threshold in accordance with a determination that the change in the current network status of the network connection is a decrease in the bandwidth of the network connection below a first bandwidth threshold.

In some embodiments, adjusting the current value for the predefined flatness threshold for detecting a flat area within the respective frame includes: decreasing the current value for the predefined flatness threshold in accordance with a determination that the change in the current network status of the network connection is an increase in the bandwidth of the network connection above a second bandwidth threshold.

In some embodiments, performing the multi-stage denoising processing on the respective frame of the sequence of images frames in the video stream further includes: after performing the denoising processing on the one or more flat areas that have been identified in the respective frame, performing denoising processing during compression encoding of the respective frame, including: determining whether the respective image frame is a forward predicted frame (P-frame); in accordance with a determination that the respective frame is a P-frame: reading a respective sub-macroblock of a plurality of sub-macroblocks of the respective frame; determining whether the respective sub-macroblock is an inter sub-macroblock; in accordance with a determination that the respective sub-macroblock is an inter sub macroblock, performing integer discrete cosine transform on the respective sub-macroblock; and in accordance with a determination that the respective sub-macroblock is not an inter sub-macroblock, forgoing performing the integer discrete cosine transform on the respective sub-macroblock.

In some embodiments, performing denoising processing during compression encoding of the respective frame further includes: in accordance with the determination that the respective frame is a P-frame and in accordance with the determination that the respective sub-macroblock is an inter sub macroblock, performing denoising processing during encoding of the respective sub-macroblock on which the integer discrete cosine transform has been performed.

In some embodiments, performing denoising processing during compression encoding of the respective frame further includes: in accordance with the determination that the respective frame is a P-frame and in accordance with the determination that the respective sub-macroblock is an intra sub macroblock, forgoing performing the integer discrete cosine transform and the denoising processing on the respective sub-macroblock.

In some embodiments, the predefined filter is a means filter.

Figure 4:
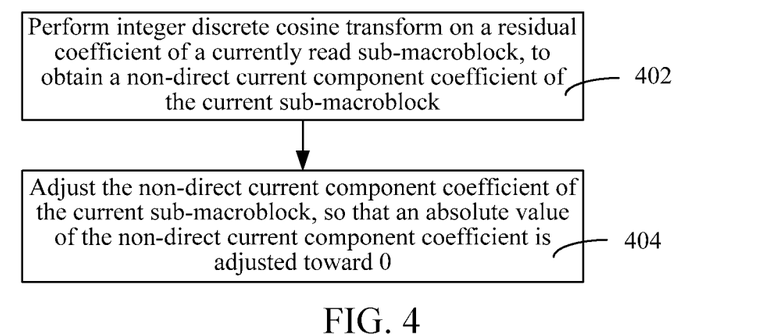
FIG. 4 is a specific flowchart of performing integer discrete cosine transform on a currently read sub-macroblock, and performing denoising processing on the current sub-macroblock on which the integer discrete cosine transform is performed.

In an embodiment, as shown in FIG. 4, the operation of performing integer discrete cosine transform on the currently read sub-macroblock, and performing denoising processing on the current sub-macroblock on which the integer discrete cosine transform is performed includes the following operations:

Step 402: Perform integer discrete cosine transform on a residual coefficient of the currently read sub-macroblock, to obtain a non-direct current component coefficient of the current sub-macroblock.

Specifically, the residual coefficient is a difference value between an image to be encoded and a predicted image. The predicted image is generated during encoding.

Step 404: Adjust the coefficient of the non-direct current (e.g., non-varying constant background portion) component (e.g., non-varying constant background portion) of the current sub-macroblock, so that an absolute value of the coefficient of the non-direct current component is adjusted toward 0.

Specifically, after the DCT (Discrete Cosine Transform) transform is performed on the residual coefficient, the $0^{th}$ coefficient at the beginning is a low-frequency direct current component, and the remaining coefficients are referred to as non-direct current components. The direct current component is a low-frequency component of the block, and determines the brightness of the image. The non-direct current component is a high-frequency component of the image, and determines the details of the image. Filtered noise is mainly of intermediate and high frequencies. Therefore, the non-direct current component is processed, as opposed to the direct current component.

In an embodiment, the operation of adjusting the non-direct current component coefficient of the current sub-macroblock, so that an absolute value of the non-direct current component coefficient is adjusted toward 0 includes:

reserving an original sign bit of the non-direct current component coefficient, and reducing the absolute value of the non-direct current component coefficient if the absolute value of the non-direct current component coefficient of the current sub-macroblock is greater than an offset of the non-direct current component coefficient of the current sub-macroblock; or setting a value of the non-direct current component coefficient to 0 if the absolute value of the non-direct current component coefficient of the current sub-macroblock is less than the non-direct current component coefficient of the current sub-macroblock.

Further, the operation of reserving an original sign bit of the non-direct current component coefficient, and reducing the absolute value of the non-direct current component coefficient if the absolute value of the non-direct current component coefficient of the current sub-macroblock is greater than an offset of the non-direct current component coefficient of the current sub-macroblock includes:

subtracting the offset from the non-direct current component coefficient if the absolute value of the non-direct current component coefficient of the current sub-macroblock is greater than the offset of the non-direct current component coefficient of the current sub-macroblock and the value of the non-direct current component coefficient is greater than 0; or adding the offset to the non-direct current component coefficient if the value of the non-direct current component coefficient is less than 0.

In an embodiment, the real-time video denoising method during encoding further includes: obtaining an offset of each coefficient of the current sub-macroblock.

The operation of obtaining an offset of each coefficient of the current sub-macroblock includes: obtaining a denoising strength (e.g., the same denoising strength that is selected and adjusted based on the change in the network bandwidth, and that is used to determine the value for the predefined flatness threshold in the earlier stage of the denoising processing), the quantity of sub-macroblocks that have been processed so far that has the same size as the current sub-macroblock, and the coefficient of the non-direct current component of the current sub-macroblock; and obtaining the offset of the coefficient of the non-direct current component of the current sub-macroblock by means of calculation according to the denoising strength, the quantity of sub-macroblocks that have been processed that has the same size as the current sub-macroblock, and the coefficient of the non-direct current component of the current sub-macroblock.

The offset indicates an offset corresponding to each coefficient of the sub-macroblock, and is a statistical value. Using H.264 as an example, the type of a sub-macroblock may be classified into different categories including the luminance 4×4, 8×8, and 16×16, and the chrominance 4×4 and 8×8.

An offset calculation formula of each type of a sub-macroblock may be as Formula (3).

$$\text{offset}(i)=(\text{strength}*\text{count}+\text{sum}(i)/2)/(\text{sum}(i)+1) \qquad \text{Formula (3)}$$

offset(i) indicates an offset of the $i^{th}$ coefficient of the sub-macroblock, strength is the denoising strength, count is the quantity of sub-macroblocks having the same size as the current sub-macroblock, sum(i) indicates a sum of values of i coefficients. sum(i)/2 is added for round-off to integers. 1 is added to the denominator to prevent the denominator from being 0. Formula (3) may be modified. For example, the number 1 added to the denominator may be replaced by another suitably selected positive number.

If the denoising strength strength is improved, a value of offset(i) may increase. The probability that each non-direct current component coefficient of the sub-macroblock becomes zero may be improved, so that the inter sub-macroblock is more similar to a corresponding reference sub-macroblock. The objectives of data flow rate reduction and denoising are finally achieved. If network bandwidth or storage space is insufficient, the filtering strength strength may be increased, so as to further reduce the data flow rate.

Figure 5:
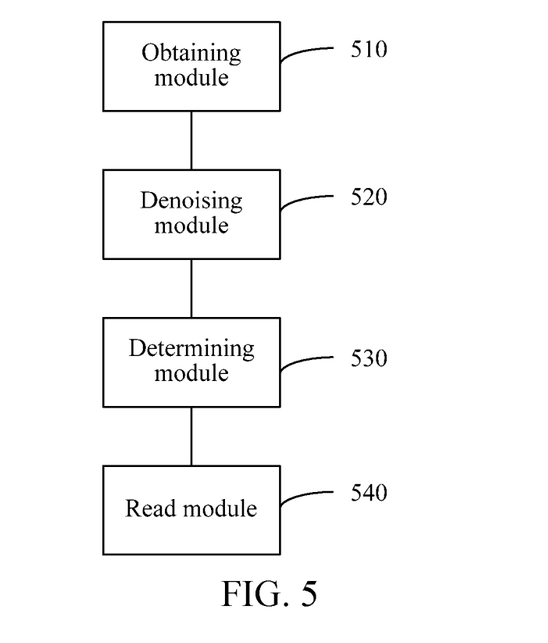
FIG. 5 is a structural block diagram of a real-time video denoising apparatus during encoding according to an embodiment.

FIG. 5 is a structural block diagram of a real-time video denoising apparatus during encoding according to an embodiment. As shown in FIG. 5, a real-time video denoising apparatus includes: an obtaining module 510, a denoising module 520, a determining module 530, and a read module 540.

The obtaining module 510 is configured to obtain a current frame and a flat area in the current frame.

In this embodiment, the obtaining module 510 is configured to: obtain a current pixel in the current frame and a selected area including the current pixel; determine whether an absolute value of a difference between a pixel value of the remaining pixel in the area and a pixel value of the current pixel is less than a specified threshold; and if yes, determine that the area belongs to a flat area; or if not, determine that the area is not a flat area.

Suppose that a range of a gray-scale value is [0, 255], the width of the image is M, and the height is N. The specified threshold is TH, a pixel value of a current pixel (i,j) is p(i,j), the radius of a filter template is r, a range with the radius r of the filter template is the area including the current pixel. When an absolute value of a difference between a pixel value of a pixel in the range with the radius r of the filter template and the pixel value (i,j) of the current pixel p(i,j) is less than the specified threshold TH, it is determined that an area having the range with the radius r of the filter template is a flat area.

The denoising module 520 is configured to perform denoising processing on the flat area.

Specifically, the denoising module 520 may perform denoising processing on a pixel in the flat area by means of means denoising or weight averaging denoising.

A pixel value of the pixel that is obtained by performing means denoising processing on the pixel in the flat area may be an average value of pixel values of all pixels, in the flat area, whose absolute value of a difference with the pixel value of the pixel is less than the specified threshold.

A calculation formula is as Formula (1) and Formula (2).

$$p'(i, j) = \sum_{m=i-r/2, n=j-r/2}^{m=i+r/2, n=j+r/2} \text{sign}(m, n) * p(m, n) \Big/ \sum_{m=i-r/2, n=j-r/2}^{m=i+r/2, n=j+r/2} \text{sign}(m, n) \qquad \text{Formula (1)}$$

$$\text{sign}(m, n) = \begin{cases} 1 & \text{if } (\text{abs}(p(i, j) - p(m, n)) < TH \\ 0 & \text{else} \end{cases} \qquad \text{Formula (2)}$$

p(i,j) indicates a pixel value of a pixel (i,j) on which denoising is not performed; p(m,n) indicates a pixel value of a pixel (m,n) on which denoising is not performed; p'(i,j) indicates a pixel value of the pixel (i,j) on which the denoising is performed. A value of (m,n) is determined by the radius r.

Performing weight averaging denoising on the pixel in the flat area means assigning a weight value to each pixel involved in the calculation in Formula (1) and Formula (2). Pixel values of all pixels whose absolute value of a difference with a pixel value of the pixel is less than the specified threshold in the flat area is multiplied by weight values corresponding to the pixels, and then an average value is evaluated, so as to obtain a pixel value of the pixel on which the denoising is performed.

The specified threshold TH herein may be controlled by the filtering strength. If TH=255, the filtering is degraded to means filtering. In this case, the filtering strength is the strongest. If TH=0, the image is not filtered. Therefore, if the bandwidth is relatively low, a value of TH may be duly increased, and relatively strong filtering is performed on the image, so as to reduce the code rate. If the bandwidth is relatively high, the value of TH may be decreased, so that only the flat area is filtered, to prevent damage of texture and boundary information.

The determining module 530 is configured to determine whether the current frame is a P frame; and if yes, the reading module 540 is configured to read a sub-macroblock of the current frame; or if not, the procedure ends.

Specifically, frames during video encoding are classified into an I frame, a P frame, and a B frame. The I frame is an intra reference frame, is also referred to as a key frame, and is the first frame of GOP encoding. The encoding of the I frame does not rely on previous and following frames. The P frame is a encoding image of compressing the transmitted data volume by fully reducing time redundant information with a previous coded frame in an image sequence, and is also referred to as a predicted frame. The B frame is a bi-directional predicted frame. When a frame is compressed into a B frame, reference frames of the frame are several previous neighboring frames, the current frame, and several following frames. After I frame space is set during the video encoding, only P frames and B frames may exist between two neighboring I frames. An application scenario of a video call requires for extremely high real time. I frames and P frames are usually selected rather than B frames with latency.

The determining module 530 is further configured to determine whether the currently read sub-macroblock is an inter sub-macroblock; and if yes, the denoising module is further configured to: perform integer discrete cosine transform on the currently read sub-macroblock, and perform denoising processing on the current sub-macroblock on which the integer discrete cosine transform is performed. Further, the determining module 530 determines whether the currently read sub-macroblock is the last inter sub-macroblock of the current frame; and if yes, end the procedure; otherwise, the read module 540 is further configured to read the next sub-macroblock, and then the determining module 540 determines whether the currently read sub-macroblock is an inner sub-macroblock.

The inter sub-macroblock is an inter sub-macroblock. A coefficient of the inter sub-macroblock may be adjusted by using a value of a reference block, so that the inter sub-macroblock is more similar to the reference block of the inter sub-macroblock. An intra block has no corresponding reference block. Therefore, the intra block is not processed. The intra block only relies on a current frame, and is obtained by means of prediction according to the upper pixel and the left pixel of the location of the current frame.

By means of the real-time video denoising apparatus during encoding, denoising processing is first performed on a flat area of an image, so as to reduce noise in the flat area; integer discrete cosine transform is further performed on a sub-macroblock of a current frame; denoising processing is performed on the current sub-macroblock on which the integer discrete cosine transform is performed. The integer discrete cosine transform is an existing module during encoding, and therefore can be directly multiplexed, so as to reduce the amount of calculation. The size of encoded data streams is decreased by means of denoising, a real-time video is implemented, and the bottleneck of network bandwidth is broken through.

In an embodiment, the denoising module 520 is further configured to: perform integer discrete cosine transform on a residual coefficient of the currently read sub-macroblock, to obtain a non-direct current component coefficient of the current sub-macroblock; and adjust the non-direct current component coefficient of the current sub-macroblock, so that an absolute value of the absolute value of the non-direct current component coefficient is adjusted toward 0.

Specifically, after the DCT transform is performed on the residual coefficient, the $0^{th}$ coefficient at the beginning is a low-frequency direct current component, and the remaining coefficients are totally referred to as non-direct current components. The direct current component is a low-frequency component of the block, and determines the brightness of the image. The non-direct current component is a high-frequency component of the image, and determines the details of the image. Filtered noise is mainly of intermediate and high frequencies. Therefore, the non-direct current component is mainly processed.

In an embodiment, the denoising module 520 is further configured to: reserve an original sign bit of the non-direct current component coefficient, and reduce the absolute value of the non-direct current component coefficient if the absolute value of the non-direct current component coefficient of the current sub-macroblock is greater than an offset of the non-direct current component coefficient of the current sub-macroblock; or set a value of the non-direct current component coefficient to 0 if the absolute value of the non-direct current component coefficient of the current sub-macroblock is less than the non-direct current component coefficient of the current sub-macroblock.

Further, the denoising module 520 is further configured to: subtract the offset from the non-direct current component coefficient if the absolute value of the non-direct current component coefficient of the current sub-macroblock is greater than the offset of the non-direct current component coefficient of the current sub-macroblock and the value of the non-direct current component coefficient is greater than 0; or add the offset to the non-direct current component coefficient if the value of the non-direct current component coefficient is less than 0.

Figure 6:
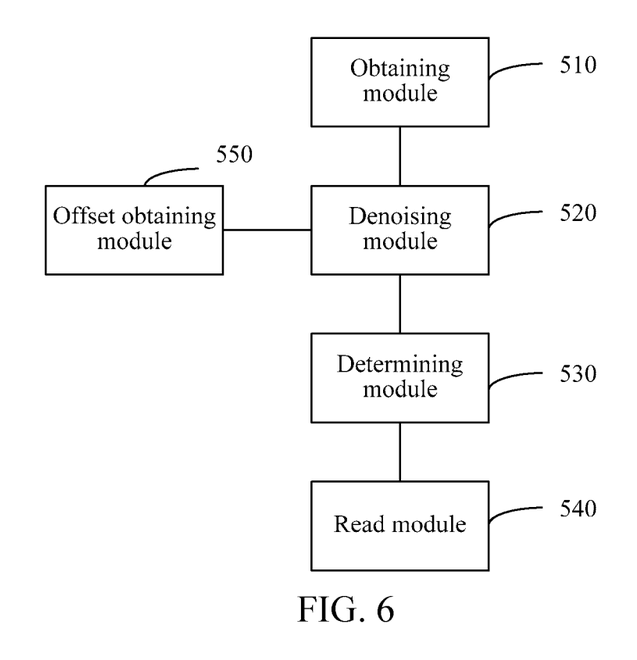
FIG. 6 is a structural block diagram of a real-time video denoising apparatus during encoding according to another embodiment.

FIG. 6 is a structural block diagram of a real-time video denoising apparatus during encoding according to another embodiment. As shown in FIG. 6, in addition to the obtaining module 510, the denoising module 520, the determining module 530, and the read module 540, the real-time video denoising apparatus during encoding further includes an offset obtaining module 550.

The offset obtaining module 550 is configured to obtain an offset of each coefficient of the current sub-macroblock, specifically including: obtaining the denoising strength, the quantity of times of processing sub-macroblocks having the same size with the current sub-macroblock, and the non-direct current component coefficient of the current sub-macroblock; and obtaining the offset of the non-direct current component coefficient of the current sub-macroblock by means of calculation according to the denoising strength, the quantity of times, and the non-direct current component coefficient of the current sub-macroblock.

The offset indicates an offset corresponding to each coefficient of the sub-macroblock, and is a statistical value. Using H.264 as an example, the type of a sub-macroblock may be the brightness 4*4, 8*8, and 16*16, and the chrominance 4*4 and 8*8.

An offset calculation formula of each type of a sub-macroblock may be as Formula (3).

$$\text{offset}(i) = (\text{strength} * \text{count} + \text{sum}(i)/2)/(\text{sum}(i)+1) \quad \text{Formula (3)}$$

offset(i) indicates an offset of the $i^{th}$ coefficient of the sub-macroblock, strength is the denoising strength, count is the quantity of times of processing sub-macroblocks having the same size as the current sub-macroblock, sum(i) indicates a sum of values of i coefficients. sum(i)/2 is added for round-off. 1 is added to the denominator to prevent the denominator from being 0. Formula (3) may be deformed. For example, 1 added to the denominator may be another positive number.

If the filtering strength strength is improved, a value of offset(i) may increase. The probability that each non-direct current component coefficient of the sub-macroblock becomes zero may be improved, so that the inter sub-macroblock is more similar to a corresponding reference block. The objectives of code rate reduction and denoising are finally achieved. If network bandwidth or storage space is insufficient, the filtering strength may be improved, so as to reduce the code rate.

A person of ordinary skill in the art may understand that all or some of the operations of the methods in the foregoing embodiments may be implemented by a computer program instructing relevant hardware. The program may be stored in a non-volatile computer readable storage medium, and may include, when executed, the procedures of the foregoing method embodiments. The storage medium may be a magnetic disk, an optical disc, a read-only memory (ROM), or the like.

The foregoing embodiments only describe several implementation manners of the present disclosure, and their description is specific and detailed, but cannot therefore be understood as a limitation to the patent scope of the present disclosure. It should be noted that a person of ordinary skill in the art may further make variations and improvements without departing from the conception of the present disclosure, and these all fall within the protection scope of the present disclosure. Therefore, the patent protection scope of the present disclosure should be subject to the appended claims.

What is claimed is:

1. A video denoising method, comprising:
at an electronic device having one or more processors and memory:
  receiving a video stream comprising a sequence of image frames from a video source;
  while receiving the video stream from the video source, performing denoising on a respective frame of the sequence of image frames in the video stream to obtain a processed frame, including:
    detecting, at the electronic device, a bandwidth change in a current network status of a network connection between the electronic device and a remote destination device;
    determining a current value for a predefine flatness threshold for detecting a flat area within the respective frame of the video stream in accordance with the bandwidth change in the current network status of the network connection, wherein a difference between any two adjacent pixel values in the flat area is smaller than the predefined flatness threshold;
    identifying one or more flat areas within the respective frame in accordance with the predefined flatness threshold that has been determined in accordance with the bandwidth change in the current network status of the network connection; and
    performing, using a predefined filter, a first denoising process on the one or more flat areas that have been identified in accordance with the predefined flatness threshold that has been adjusted in accordance with the bandwidth change in the current network status of the network connection;
    after performing the first denoising process, determining a prediction type of the respective frame;
    in accordance with a determination that the prediction type of the respective frame is a forward predicted frame (P-frame), performing a second denoising process during compression encoding of the respective frame, including:
      in accordance with a determination that a respective sub-macroblock of the respective frame is an inter sub-macroblock, performing an integer discrete cosine transform (DCT) operation on the respective inter sub-macroblock to obtain low-frequency component coefficients and high-frequency component coefficients of the respective inter sub-macroblock;
      determining a component offset value in accordance with the bandwidth change in the current network status of the network connection;
      subtracting the component offset value from each of the high-frequency component coefficients of the respective inter sub-macroblock of the respective frame if an absolute value of a respective high-frequency component coefficient is greater than the component offset value; and
  sending the processed frame to the remote destination device.

2. The method according to claim 1, wherein adjusting the current value for the predefined flatness threshold for detecting a flat area within the respective frame includes:
increasing the current value for the predefined flatness threshold in accordance with a determination that the bandwidth change in the current network status of the network connection is a decrease in the bandwidth of the network connection below a first bandwidth threshold.

3. The method according to claim 2, wherein adjusting the current value for the predefined flatness threshold for detecting a flat area within the respective frame includes:
decreasing the current value for the predefined flatness threshold in accordance with a determination that the bandwidth change in the current network status of the network connection is an increase in the bandwidth of the network connection above a second bandwidth threshold.

4. The method according to claim 1, wherein performing denoising processing during compression encoding of the respective frame further includes:
in accordance with a determination that the respective sub-macroblock is an intra sub macroblock, forgoing performing the integer discrete cosine transform and the denoising processing on the respective sub-macroblock.

5. An electronic device for video denoising, comprising:
one or more processors and memory including instructions, the instructions, when executed by the one or more processors, cause the processors to perform operations comprising:
receiving a video stream comprising a sequence of image frames from a video source;
while receiving the video stream from the video source, performing denoising on a respective frame of the sequence of image frames in the video stream to obtain a processed frame, including:
detecting, at the electronic device, a bandwidth change in a current network status of a network connection between the electronic device and a remote destination device;
determining a current value for a predefine flatness threshold for detecting a flat area within the respective frame of the video stream in accordance with the bandwidth change in the current network status of the network connection, wherein a difference between any two adjacent pixel values in the flat area is smaller than the predefined flatness threshold;
identifying one or more flat areas within the respective frame in accordance with the predefined flatness threshold that has been determined in accordance with the bandwidth change in the current network status of the network connection; and
performing, using a predefined filter, a first denoising process on the one or more flat areas that have been identified in accordance with the predefined flatness threshold that has been adjusted in accordance with the bandwidth change in the current network status of the network connection;
after performing the first denoising process, determining a prediction type of the respective frame;
in accordance with a determination that the prediction type of the respective frame is a forward predicted frame (P-frame), performing a second denoising process during compression encoding of the respective frame, including:
in accordance with a determination that a respective sub-macroblock of the respective frame is an inter sub-macroblock, performing an integer discrete cosine transform (DCT) operation on the respective inter sub-macroblock to obtain low-frequency component coefficients and high-frequency component coefficients of the respective inter sub-macroblock;
determining a component offset value in accordance with the bandwidth change in the current network status of the network connection;
subtracting the component offset value from each of the high-frequency component coefficients of the respective inter sub-macroblock of the respective frame if an absolute value of a respective high-frequency component coefficient is greater than the component offset value; and
sending the processed frame to the remote destination device.

6. The electronic device according to claim 5, wherein adjusting the current value for the predefined flatness threshold for detecting a flat area within the respective frame includes:
increasing the current value for the predefined flatness threshold in accordance with a determination that the bandwidth change in the current network status of the network connection is a decrease in the bandwidth of the network connection below a first bandwidth threshold.

7. The electronic device according to claim 6, wherein adjusting the current value for the predefined flatness threshold for detecting a flat area within the respective frame includes:
decreasing the current value for the predefined flatness threshold in accordance with a determination that the bandwidth change in the current network status of the network connection is an increase in the bandwidth of the network connection above a second bandwidth threshold.

8. The electronic device according to claim 5, wherein performing denoising processing during compression encoding of the respective frame further includes:
in accordance with a determination that the respective sub-macroblock is an intra sub macroblock, forgoing performing the integer discrete cosine transform and the denoising processing on the respective sub-macroblock.

9. A non-transitory computer-readable storage medium storing instructions, the instructions, when executed by one or more processors, cause the processors to perform operations comprising:
receiving a video stream comprising a sequence of image frames from a video source;
while receiving the video stream from the video source, performing denoising on a respective frame of the sequence of image frames in the video stream to obtain a processed frame, including:
detecting, at the electronic device, a bandwidth change in a current network status of a network connection between the electronic device and a remote destination device;
determining a current value for a predefine flatness threshold for detecting a flat area within the respective frame of the video stream in accordance with the bandwidth change in the current network status of the network connection, wherein a difference between any two adjacent pixel values in the flat area is smaller than the predefined flatness threshold;

identifying one or more flat areas within the respective frame in accordance with the predefined flatness threshold that has been determined in accordance with the bandwidth change in the current network status of the network connection; and performing, using a predefined filter, a first denoising process on the one or more flat areas that have been identified in accordance with the predefined flatness threshold that has been adjusted in accordance with the bandwidth change in the current network status of the network connection;

after performing the first denoising process, determining a prediction type of the respective frame;

in accordance with a determination that the prediction type of the respective frame is a forward predicted frame (P-frame), performing a second denoising process during compression encoding of the respective frame, including:

in accordance with a determination that a respective sub-macroblock of the respective frame is an inter sub-macroblock, performing an integer discrete cosine transform (DCT) operation on the respective inter sub-macroblock to obtain low-frequency component coefficients and high-frequency component coefficients of the respective inter sub-macroblock;

determining a component offset value in accordance with the bandwidth change in the current network status of the network connection;

subtracting the component offset value from each of the high-frequency component coefficients of the respective inter sub-macroblock of the respective frame if an absolute value of a respective high-frequency component coefficient is greater than the component offset value; and sending the processed frame to the remote destination device.

10. The computer-readable storage medium according to claim 9, wherein adjusting the current value for the predefined flatness threshold for detecting a flat area within the respective frame includes:

increasing the current value for the predefined flatness threshold in accordance with a determination that the bandwidth change in the current network status of the network connection is a decrease in the bandwidth of the network connection below a first bandwidth threshold.

11. The computer-readable storage medium according to claim 10, wherein adjusting the current value for the predefined flatness threshold for detecting a flat area within the respective frame includes:

decreasing the current value for the predefined flatness threshold in accordance with a determination that the bandwidth change in the current network status of the network connection is an increase in the bandwidth of the network connection above a second bandwidth threshold.

* * * * *